(12) United States Patent
Miyaji

(10) Patent No.: US 9,013,422 B2
(45) Date of Patent: Apr. 21, 2015

(54) DEVICE, METHOD, AND STORAGE MEDIUM STORING PROGRAM

(75) Inventor: Takaaki Miyaji, Yokohama (JP)

(73) Assignee: Kyocera Corporation, Kyoto (JP)

(*) Notice: Subject to any disclaimer, the term of this patent is extended or adjusted under 35 U.S.C. 154(b) by 0 days.

(21) Appl. No.: 13/360,906

(22) Filed: Jan. 30, 2012

(65) Prior Publication Data

US 2013/0076659 A1 Mar. 28, 2013

(30) Foreign Application Priority Data

Sep. 28, 2011 (JP) .................................. 2011-213536
Jan. 26, 2012 (JP) .................................. 2012-014666

(51) Int. Cl.
| | | |
|---|---|---|
| G06F 3/0487 | (2013.01) | |
| H04M 1/725 | (2006.01) | |
| G06F 3/0482 | (2013.01) | |
| G06F 3/0484 | (2013.01) | |
| G06F 3/0488 | (2013.01) | |

(52) U.S. Cl.
CPC ......... *H04M 1/72583* (2013.01); *G06F 3/0482* (2013.01); *G06F 3/0484* (2013.01); *G06F 2203/04808* (2013.01); *G06F 3/04883* (2013.01); *H04M 2250/12* (2013.01)

(58) Field of Classification Search
None
See application file for complete search history.

(56) References Cited

U.S. PATENT DOCUMENTS

| 2006/0143578 A1* | 6/2006 | Maktedar .................... 715/847 |
|---|---|---|
| 2008/0165160 A1 | 7/2008 | Kocienda et al. |
| 2011/0078624 A1* | 3/2011 | Missig et al. .................. 715/802 |
| 2011/0202872 A1* | 8/2011 | Park ............................... 715/790 |
| 2011/0216075 A1* | 9/2011 | Shigeta et al. ................ 345/473 |

FOREIGN PATENT DOCUMENTS

| JP | 10-222337 A | 8/1998 |
|---|---|---|
| JP | 2000-305692 A | 11/2000 |
| WO | 2008086302 A1 | 7/2008 |

OTHER PUBLICATIONS

Partial English Translation of Must-see for every iPad user! Very comfortable operation with multitasking gesture! http://nori510.com/archives/4720,May 6, 2011 (searched on Jul. 11, 2012).
Partial English Translation http://it-lovers.com/8/ipad_swipe_gestrure.
Japanese Office Action for Application No. 2012-097169 mailed Jul. 24, 2012.
Japanese Office Action for Application No. 2012-097169 mailed Oct. 16, 2012.

(Continued)

*Primary Examiner* — Jason Olson
*Assistant Examiner* — Damon Treitler
(74) *Attorney, Agent, or Firm* — Lowe Hauptman & Ham LLP

(57) ABSTRACT

According to an aspect, a device includes a touch screen display and a controller. The touch screen display displays a screen of an application executed in the foreground. When the first gesture is performed on the touch screen display while a first application is executed in the foreground and a second application is executed in the background, the controller causes the first application to perform an operation according to the first gesture. When the second gesture is performed on the touch screen display while the first application is executed in the foreground and the second application is executed in the background, the controller executes the second application in the foreground.

13 Claims, 15 Drawing Sheets

(56) References Cited

OTHER PUBLICATIONS

"Tablets & Slate PCs Collections, iPad 2 Wi-Fi Model 16GB White with Stylish Design and Operability", Weekly ASCII, Jun. 21, 2011, p. 23, vol. 23, 838th Issue, ASCII Media Works Inc.
"Apple's Strategic Move to Next Generation (Part 2): iOS 5, iOS 5 Unleashed from PC and Achieving Complete Transformation", Mac People, Jun. 29, 2011, pp. 24-29, vol. 17, No. 12, ASCII Media Works Inc.
"Windows Mobile 6 Application Book", First edition, Feb. 20, 2009, pp. 232-234, Mainichi Communications Inc.
"Introduction to BlackBerry Application Development", First edition, Dec. 1, 2010, pp. 49-58, Impress Japan Corporation.
"iOs 4 Programming Book", First edition, Feb. 1, 2011, pp. 39-48, Impress Japan Corporation.
Trial Decision dated Nov. 19, 2013, corresponding to Japanese patent application No. 2012-97169, for which an explanation of relevance is attached.

* cited by examiner

| APPLICATION / ICON | DOWN-LOADED DATE | LAST EXECUTED DATE | NUMBER OF EXECUTION TIMES IN LAST ONE MONTH | ... | GROUP |
|---|---|---|---|---|---|
| BROWSER / Browser | 201X/1/3 8:00 | 201X/7/11 16:00 | 576 | ... | COMMUNICATION |
| CALCULATOR / Calculator | 201X/4/2 10:00 | 201X/6/30 17:00 | 15 | ... | UTILITIES |
| CALENDAR / Calendar | 201X/6/25 19:00 | 201X/7/7 23:00 | 143 | ... | UTILITIES |
| CAMERA / Camera | 201X/10/5 14:00 | 201X/6/29 15:00 | 392 | ... | ENTERTAINMENT |
| ... | ... | ... | ... | | ... |
| CLOCK / Clock | 201X/1/3 8:00 | 201X/5/18 23:00 | 67 | ... | UTILITIES |
| MAIL / Mail | 201X/1/3 8:00 | 201X/7/11 17:00 | 445 | ... | COMMUNICATION |
| MUSIC PLAYER / Music | 201X/1/10 0:00 | 201X/7/11 19:00 | 79 | ... | ENTERTAINMENT |
| ... | ... | ... | ... | | ... |
| PHONE / Phone | 201X/1/3 8:00 | 201X/7/11 23:00 | 290 | ... | COMMUNICATION |
| PHOTO / Photos | 201X/5/18 7:00 | 201X/6/19 19:00 | 142 | ... | ENTERTAINMENT |
| SETTING / Settings | 201X/1/3 8:00 | 201X/4/29 3:00 | 77 | ... | OTHER |
| SHORT MESSAGE / SMS | 201X/4/23 13:00 | 201X/7/11 21:00 | 301 | ... | ENTERTAINMENT |
| WEATHER / Weather | 201X/3/15 11:00 | 201X/7/10 22:00 | 150 | ... | NEWS |

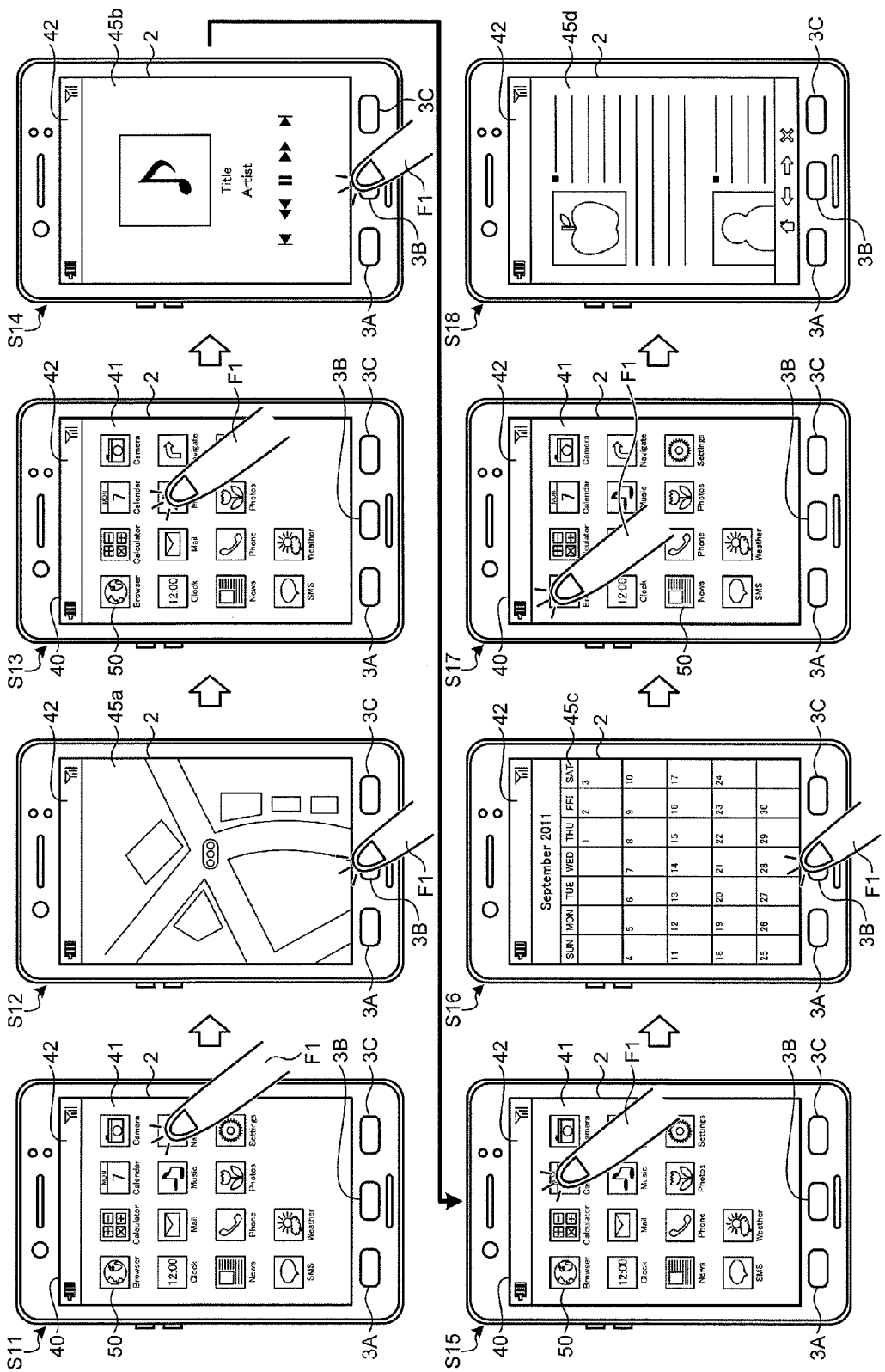

DEVICE, METHOD, AND STORAGE MEDIUM STORING PROGRAM

CROSS-REFERENCE TO RELATED APPLICATIONS

This application claims priority from Japanese Application No. 2011-213536, filed on Sep. 28, 2011, and Japanese Application No. 2012-014666, filed on Jan. 26, 2012, the contents of which are incorporated by reference herein in its entirety.

BACKGROUND

1. Technical Field

The present application relates to a device, a method, and a storage medium storing therein a program. More particularly, the present application relates to a device including a touch screen, a method of controlling the device, and a storage medium storing therein a program for controlling the device.

2. Description of the Related Art

A touch screen device having a touch screen has been known. Examples of the touch screen devices include, but are not limited to, a smartphone and a tablet. The touch screen device detects a gesture of a finger, a pen, or a stylus pen through the touch screen. Then, the touch screen device operates according to the detected gesture. An example of the operation according to the detected gesture is described in, for example, International Publication Pamphlet No. 2008/086302.

The basic operation of the touch screen device is implemented by an operating system (OS) built into the device. Examples of the OS built into the touch screen device include, but are not limited to, Android, BlackBerry OS, iOS, Symbian OS, and Windows Phone.

Some touch screen devices can execute different applications in a foreground and a background. Many of such devices can switch between an application executed in the foreground and an application executed in the background according to user's operation.

For the foregoing reasons, there is a need for a device, a method, and a program for improving operability in the case of switching between the application executed in the foreground and the application executed in the background.

SUMMARY

According to an aspect, a device includes a touch screen display and a controller. The touch screen display displays a screen of an application executed in the foreground. When the first gesture is performed on the touch screen display while a first application is executed in the foreground and a second application is executed in the background, the controller causes the first application to perform an operation according to the first gesture. When the second gesture is performed on the touch screen display while the first application is executed in the foreground and the second application is executed in the background, the controller executes the second application in the foreground.

According to another aspect, a method is performed for controlling a device provided with a touch screen display. The method includes: executing a first application in the foreground; executing a second application in the background; displaying a screen of the first application on the touch screen display; causing, when a first gesture is performed on the touch screen display while a first application is executed in the foreground and a second application is executed in the background, the first application to perform an operation according to the first gesture; and executing, when is a second gesture is performed on the touch screen display while a first application is executed in the foreground and a second application is executed in the background, a second application in the foreground.

According to another aspect, a non-transitory storage medium stores a program therein. When executed by a device provided with a touch screen display, the program causes the device to execute: executing a first application in the foreground; executing a second application in the background; displaying a screen of the first application on the touch screen display; causing, when is a first gesture is performed on the touch screen display while a first application is executed in the foreground and a second application is executed in the background, the first application to perform an operation according to the first gesture; and executing, when is a second gesture is performed on the touch screen display while a first application is executed in the foreground and a second application is executed in the background, a second application in the foreground.

BRIEF DESCRIPTION OF THE DRAWINGS

FIG. 6 is a diagram illustrating an example of contents stored in a table;

FIG. 7 is a diagram illustrating a first example of the control performed by the smartphone;

DETAILED DESCRIPTION

Exemplary embodiments of the present invention will be explained in detail below with reference to the accompanying drawings. A smartphone will be explained below as an example of a device provided with a touch screen.

Figure 1:
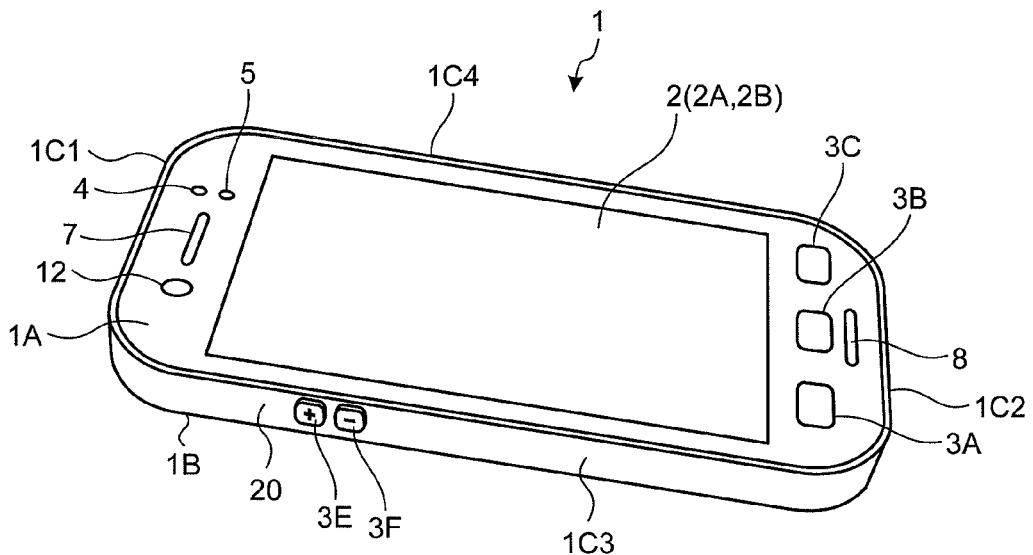
FIG. 1 is a perspective view of a smartphone according to an embodiment.
Figure 2:
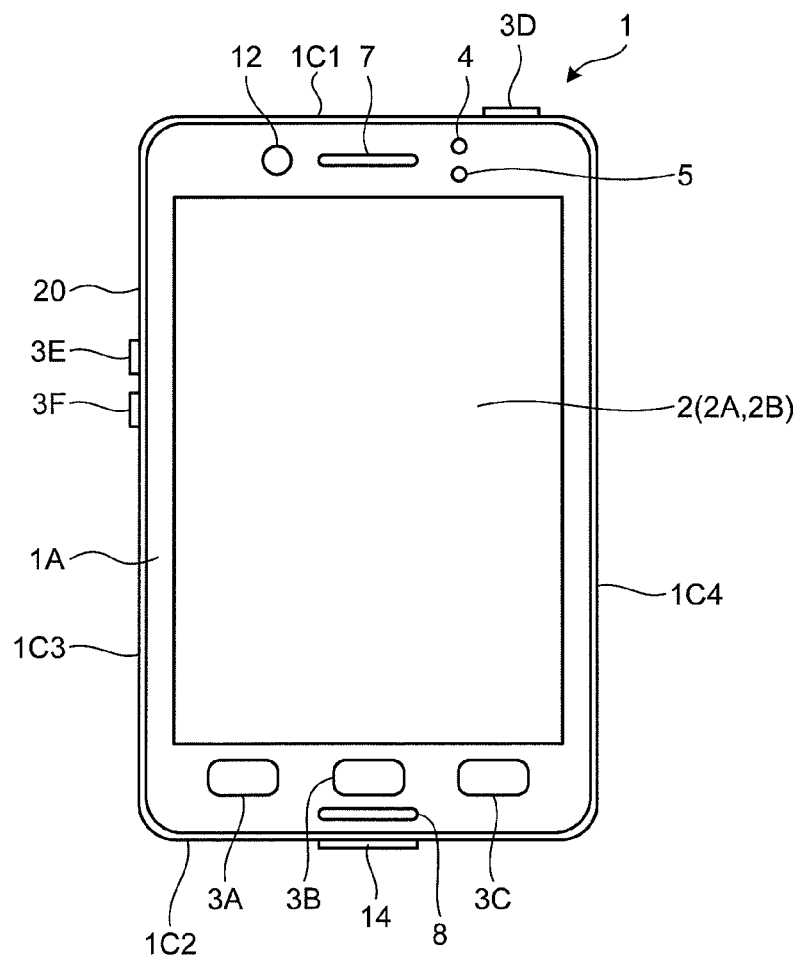
FIG. 2 is a front view of the smartphone.
Figure 3:
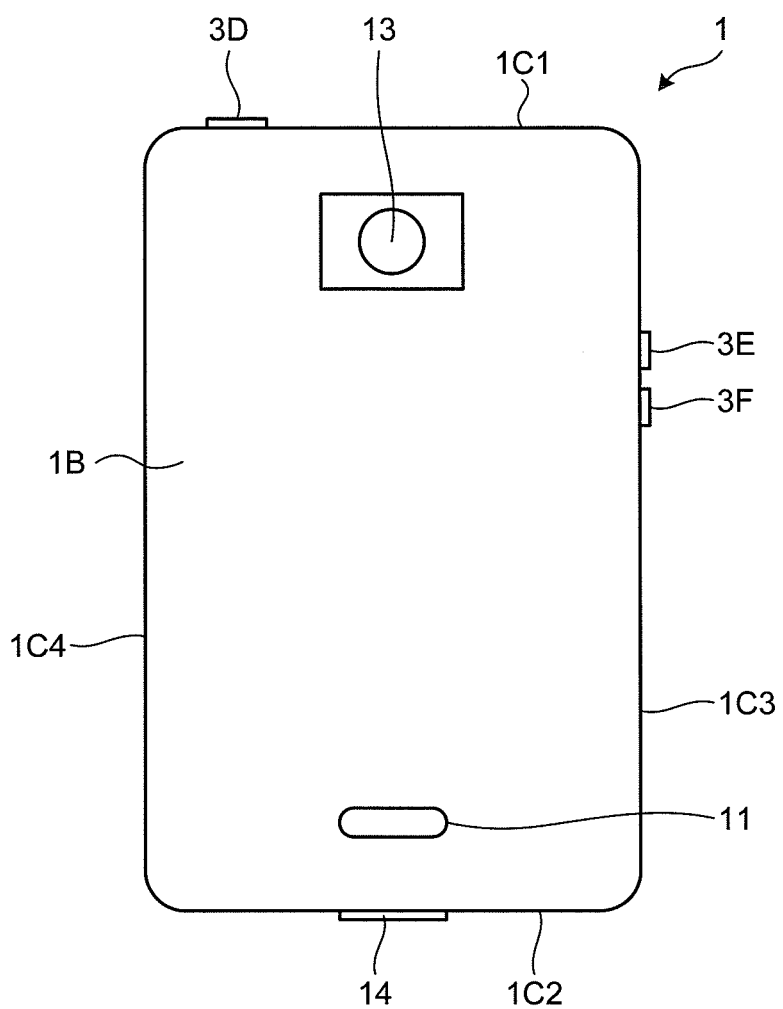
FIG. 3 is a back view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a speaker 11 and a camera 13, which are provided in the back face 1B. The smartphone 1 includes buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped, however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner, however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively, however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electro-luminescence display (OELD), or an inorganic electro-luminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B. In the description herein below, a finger, a pen, a stylus pen, or the like that contacts with the touch screen 2B may be called "contacting object".

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The Smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, and "leftward flick" in which the finger moves leftward on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

In the present embodiment, a gesture performed with one finger may be called "single-touch gesture". In the present embodiment, a gesture performed with two fingers or more may be called "multi-touch gesture". The pinch in and the pinch out are the multi-touch gesture. The tap, the flick, the swipe, and the like are single-touch gestures if they are performed with one finger, and are multi-touch gestures if they are performed with two fingers or more.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of simplicity of explanation, description may be changed in such a manner as "the touch screen 2B detects the gesture, and then the smartphone 1 determines the type of the detected gesture as X" to "the smartphone 1 detects X" or to "the controller detects X".

Figure 4:
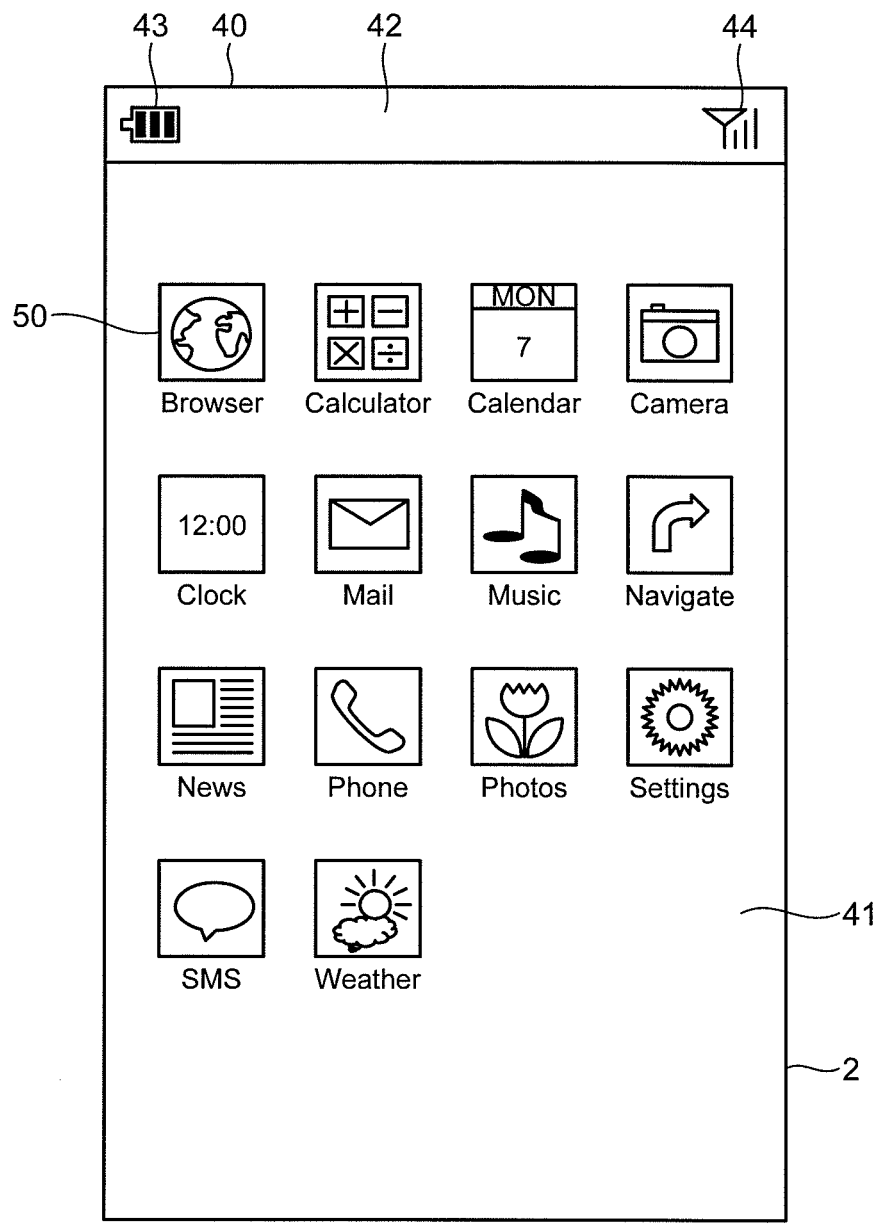
FIG. 4 is a diagram illustrating an example of a home screen.

An example of the screen displayed on the display 2A will be explained below with reference to FIG. 4. FIG. 4 represents an example of a home screen. The home screen may also be called "desktop", "standby screen", "idle screen", or "standard screen". The home screen is displayed on the display 2A. The home screen is a screen allowing the user to select which one of applications (programs) installed in the smartphone 1 is executed. The smartphone 1 executes the application selected on the home screen in the foreground. The screen of the application executed in the foreground is displayed on the display 2A.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application. The icons 50 include an image and a character string. The icons 50 may contain a symbol or a graphic instead of an image. The icons 50 do not have to include either one of the image and the character string. The icons 50 are arranged based on a layout pattern. A wall paper 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

The smartphone 1 can include a plurality of home screens. The smartphone 1 determines, for example, the number of home screens according to setting by the user. The smartphone 1 displays a selected one on the display 2A even if there is a plurality of home screens.

The smartphone 1 can change a home screen to be displayed on the display 2A. When a gesture is detected while displaying one of home screens, the smartphone 1 changes the home screen to be displayed on the display 2A to another one. For example, when detecting a rightward flick, the smartphone 1 changes the home screen to be displayed on the display 2A to a home screen on the left side. For example, when detecting a leftward flick, the smartphone 1 changes the home screen to be displayed on the display 2A to a home screen on the right side. The smartphone 1 changes the home screen to be displayed on the display 2A from a first home screen to a second home screen, when a gesture is detected while displaying the first home screen, such that the area of the first home screen displayed on the display 2A gradually becomes smaller and the area of the second home screen displayed gradually becomes larger. The smartphone 1 may switch the home screens such that the first home screen is instantly replaced by the second home screen.

An area 42 is provided along the top edge of the display 2A. Displayed on the area 42 are a remaining mark 43 indicating a remaining amount of a power supply and a radio-wave level mark 44 indicating an electric field strength of radio wave for communication. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

A vertical direction of the home screen 40 will be explained. In the following explanation, the vertical direction of the home screen 40 is determined based on a vertical direction of text or an image displayed on the touch screen display 2. Therefore, in the home screen 40 illustrated in FIG. 4, the side close to the area 42 in the longitudinal direction of the touch screen display 2 is the upper side, and the side far from the area 42 is the lower side. The side with the radio-wave level mark 44 displayed in the area 42 is the right side of the home screen 40, and the side with the remaining mark 43 displayed in the area 42 is the left side of the home screen 40.

The home screen 40 illustrated in FIG. 4 is only an example, and therefore the configuration of each of elements, the arrangement of the elements, the number of home screens 40, the way to perform each of operations on the home screen 40, and the like do not have to be like the above mentioned explanation.

Figure 5:
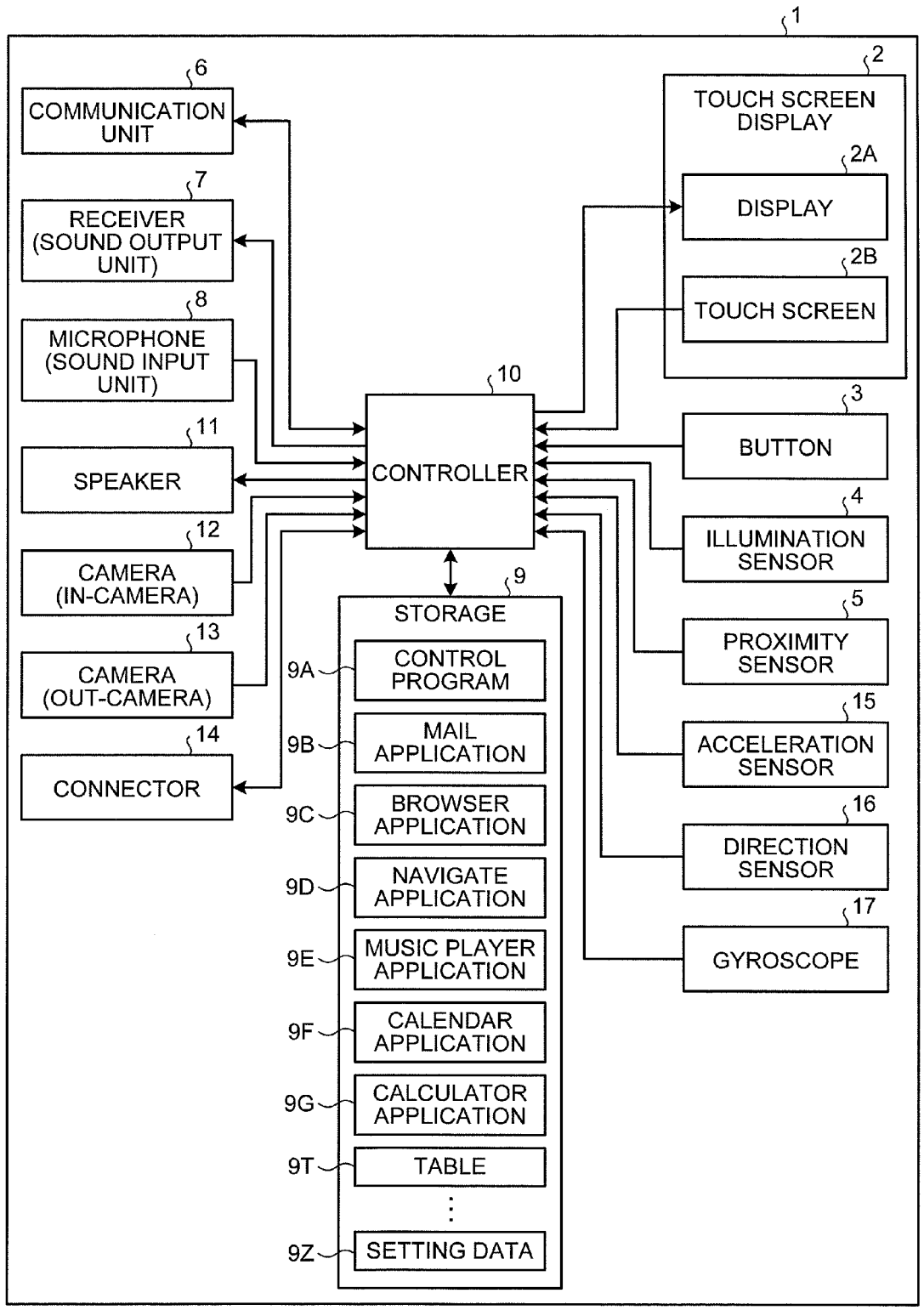
FIG. 5 is a block diagram of the smartphone.

FIG. 5 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the speaker 11, the cameras 12 and 13, the connector 14, an acceleration sensor 15, a direction (orientation) sensor 16, and a gyroscope 17.

The touch screen display 2 includes, as explained above, the display 2A and the touch screen 2B. The display 2A displays text, images, symbols, graphics, or the like. The touch screen 2B detects gestures.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects that, for example, the touch screen display 2 is brought close to someone's face. The illumination sensor 4 and the proximity sensor 5 may be configured as one sensor. The illumination sensor 4 can be used as a proximity sensor.

The communication unit 6 performs communication via radio waves. A communication system supported by the communication unit 6 is wireless communication standard. The wireless communication standard includes, for example, a communication standard of cellar phones such as 2G, 3 G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handyphone System (PHS). The wireless communication standard further includes, for example, Worldwide Interoperability for Microwave Access (WiMAX), IEEE 802.11, Bluetooth, Infrared Data Association (IrDA), and Near Field Communication (NFC). The communication unit 6 may support one or more communication standards.

The receiver 7 and the speaker 11 are sound output units. The receiver 7 and the speaker 11 output a sound signal transmitted from the controller 10 as sound. The receiver 7 is used, for example, to output voice of the other party on the phone. The speaker 11 is used, for example, to output a ring tone and music. Either one of the receiver 7 and the speaker 11 may double as the other function. The microphone 8 is a sound input unit. The microphone 8 converts speech of the user or the like to a sound signal and transmit the converted signal to the controller 10.

The storage 9 stores therein programs and data. The storage 9 is used also as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

Programs stored in the storage 9 include applications executed in the foreground or the background and a control program for assisting operations of the applications. The application causes the controller 10, for example, to display a screen on the display 2A and perform a process according to a gesture detected by the touch screen 2B. The control program is, for example, an OS. The applications and the control program may be installed in the storage 9 through wireless communication by the communication unit 6 or through a non-transitory storage medium.

The storage 9 stores therein, for example, a control program 9A, a mail application 9B, a browser application 9C, a navigate application 9D, a music player application 9E, a calendar application 9F, a calculator application 9G, a table 9T, and setting data 9Z. The mail application 9B provides an e-mail function for composing, transmitting; receiving, and displaying e-mail, and the like. The browser application 9C provides a WEB browsing function for displaying WEB pages. The navigate application 9D provides a navigation function for driving directions and so on. The music player application 9E provides a player function for reproducing music and outputting the reproduced music through the receiver 7 or the speaker 11. The calendar application 9F provides a calendar function for managing one's schedule, and so on. The calculator application 9G provides a calculator function of performing, for example, four arithmetic operations. The setting data 9Z contains information related to various settings on the operations of the smartphone 1.

The control program 9A provides a function related to various controls for operating the smartphone 1. The control program 9A controls, for example, the communication unit 6, the receiver 7, and the microphone 8 to make a phone call. The function provided by the control program 9A includes functions for performing various controls such as changing of information displayed on the display 2A according to a gesture detected through the touch screen 2B. The functions provided by the control program 9A can be used in combination with a function provided by the other program such as the mail application 9B.

The table 9T is data in which an application is associated with various items related to the application. The contents of the table 9T will be explained later.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the communication unit 6, the microphone 8, and the speaker 11. The controller 10 can change the control of the function unit according to the detection result of a detector. Examples of the detectors include, but are not limited to, the touch screen 2B, the button 3, the illumination sensor 4, the proximity sensor 5, the receiver 7, the camera 12, the camera 13, the acceleration sensor 15, the direction sensor 16, and the gyroscope 17.

The controller 10 executes, for example, the control program 9A to thereby execute various controls such as changing of the information displayed on the display 2A according to the gesture detected through the touch screen 2B.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude.

Part or all of the programs and the data stored in the storage 9 in FIG. 5 may be downloaded from any other device through wireless communication by the communication unit 6. Part or all of the programs and the data stored in the storage 9 in FIG. 5 may be stored in the non-transitory storage medium that can be read by the reader included in the storage 9. Part or all of the programs and the data stored in the storage 9 in FIG. 5 may be stored in the non-transitory storage medium that can be read by a reader connected to the connector 14. Examples of the non-transitory storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 5 is only an example, and therefore it can be modified as required within a scope that does not depart from the gist of the present invention. For example, the number and the type of the button 3 are not limited to the example of FIG. 5. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 5, the smartphone 1 is provided with two cameras, however, the smartphone 1 may be provided with only one camera or with no camera. In the example of FIG. 5, the smartphone 1 is provided with three types of sensors in order to detect its position and attitude, however, the smartphone 1 does not have to be provided with some of the sensors. Alternatively, the smartphone 1 may be provided with any other type of sensor for detecting at least one of the position and the attitude.

Next, the table 9T will be explained with reference to FIG. 6. FIG. 6 is a diagram illustrating an example of contents stored in the table 9T. As illustrated in FIG. 6, the table 9T stores therein, as items related to the application, date and time on which an application is downloaded, date and time on which the application is executed last, the number of execution times of the application in the last one month, and the like, for each application.

The table 9T stores therein that the date and time on which, for example, the browser application 9C is downloaded are eight o'clock on Jan. 3rd, 201X. Moreover, the table 9T stores therein that the date and time on which the browser application 9C is executed last are 16 o'clock on Jul. 11, 201X. Furthermore, the table 9T stores therein that the number of execution times of the browser application 9C in the last one month is 576 times. The date and time on which it is executed last and the number of execution times thereof in the last one month are updated each time the application is executed.

The table 9T further stores therein a group, as an item related to the application, to which the application belongs, for each application. For example, applications related to communication such as the mail application 9B and the browser application 9C belong to a "Communication" group. Applications, such as the music player application 9E, a photo application, and a short message application, belong to an "Entertainment" group. The table 9T may store therein information for items related to a group in which a plurality of applications are collected, in addition to the information for items related to each of the applications. The information for items related to a group is updated based on the information for items related to one of the applications belonging to the group which is updated in accordance with the execution of the application.

The items stored in the table 9T are not limited thereto. The table 9T may store therein items different from the above-described items as items related to the application. The table 9T may store therein, for example, the number of execution times of the application in the last one week, the name of a creator of the application, and the like. The table 9T may store therein, for example, information of the authority indicative of the user (account) who is permitted to execute the application.

The basic configuration of the smartphone 1 according to the present embodiment has been explained so far. The following will represent examples in which the smartphone 1 according to the present embodiment provides control so as to switch between an application executed in the foreground and an application executed in the background according to an operation to the device performed by the user.

FIG. 7 is a diagram illustrating a first example of control performed by the smartphone according to the embodiment. The smartphone 1 displays, as illustrated at Step S11, the home screen 40 same as that of FIG. 4 on the display 2A (touch screen display 2). At Step S11, a user's finger F1 taps a "Navigate" icon located on the home screen 40.

When detecting the tap on the "Navigate" icon, the smartphone 1 executes the navigate application 9D and displays a screen 45a of the navigate application 9D on the display 2A, as illustrated at Step S12. At Step S12, the smartphone 1 executes the navigate application 9D in the foreground. At Step S12, the user's finger F1 clicks the button 3B.

When detecting the click on the button 3B, the smartphone 1 displays the home screen 40 on the display 2A instead of the screen 45a, as illustrated at Step S13. At Step S13 and subsequent steps, the smartphone 1 executes the navigate application 9D in the background. At Step S13, the user's finger F1 taps a "Music" icon located on the home screen 40.

When detecting the tap on the "Music" icon, the smartphone 1 executes the music player application 9E and displays a screen 45b of the music player application 9E on the display 2A, as illustrated at Step S14. At Step S14, the smartphone 1 executes the music player application 9E in the foreground and executes the navigate application 9D in the background. At Step S14, the user's finger F1 clicks the button 3B.

When detecting the click on the button 3B, the smartphone 1 displays the home screen 40 on the display 2A instead of the screen 45b, as illustrated at Step S15. At Step S15 and subsequent steps, the smartphone 1 executes the navigate application 9D and the music player application 9E in the background. At Step S15, the user's finger F1 taps a "Calendar" icon located on the home screen 40.

When detecting the tap on the "Calendar" icon, the smartphone 1 executes the calendar application 9F and displays a screen 45c of the calendar application 9F on the display 2A, as illustrated at Step S16. At Step S16, the smartphone 1 executes the calendar application 9F in the foreground, and executes the navigate application 9D and the music player application 9E in the background. At Step S16, the user's finger F1 clicks the button 3B.

When detecting the click on the button 3B, the smartphone 1 displays the home screen 40 on the display 2A instead of the screen 45c, as illustrated at Step S17. At Step S17 and subsequent steps, the smartphone 1 executes the navigate application 9D, the music player application 9E, and the calendar application 9F in the background. At Step S17, the user's finger F1 taps a "Browser" icon located on the home screen 40.

When detecting the tap on the "Browser" icon, the smartphone 1 executes the browser application 9C and displays a screen 45d of the browser application 9C on the display 2A, as illustrated at Step S18. At Step S18, the smartphone 1 executes the browser application 9C in the foreground, and executes the navigate application 9D, the music player application 9E, and the calendar application 9F in the background.

As explained above, the smartphone 1 can execute different applications in the foreground and the background. When executing the applications in the background, the smartphone 1 stores the order in which each of the applications is switched from the foreground to the background in the storage 9.

Figure 8:
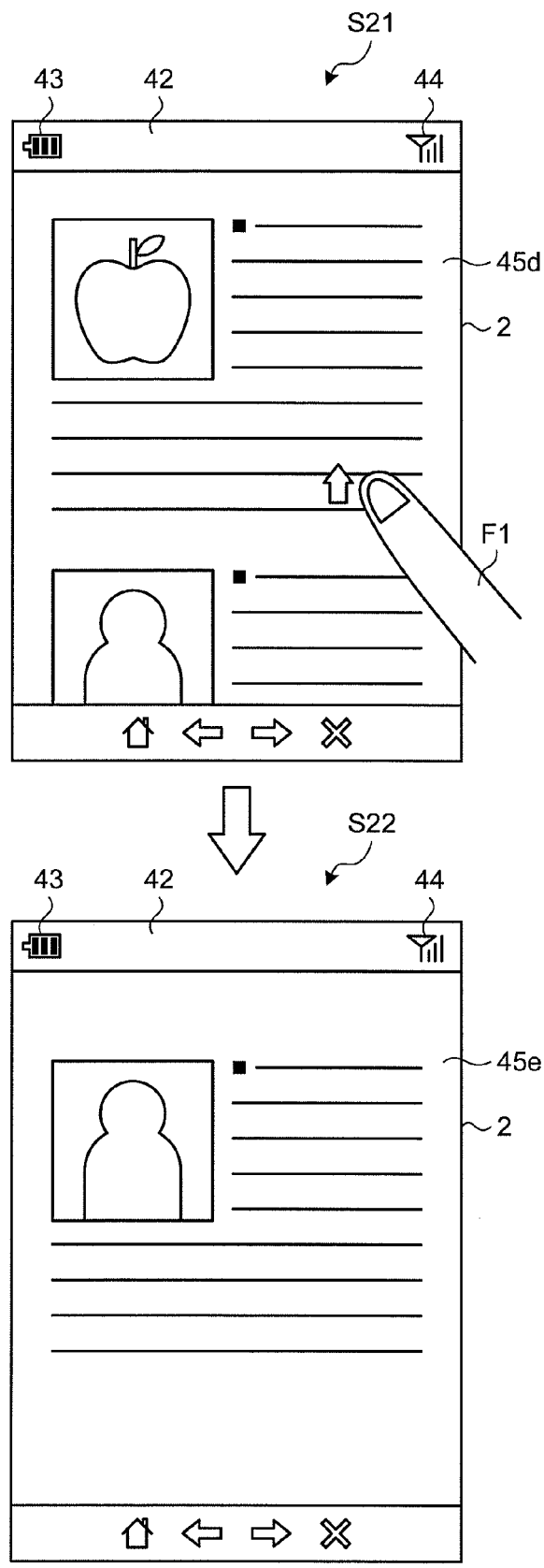
FIG. 8 is a diagram illustrating a second example of the control performed by the smartphone.

FIG. 8 is a diagram illustrating a second example of the control performed by the smartphone according to the embodiment. As illustrated at Step S21, the smartphone 1 displays the screen 45d same as that of Step S18 in FIG. 7 on the display 2A (touch screen display 2). At Step S21, the user performs an upward flick on the touch screen display 2 with his/her one finger F1.

When detecting the one-finger upward flick on the touch screen display 2, the smartphone 1 performs the process illustrated at Step S22. In the present embodiment, the browser application 9C assigns scrolling of the screen 45d to the one-finger upward flick and one-finger downward flick.

Therefore, the smartphone 1 scrolls the screen 45d upward and displays a screen 45e, at Step S22.

The browser application 9C also assigns an operation not only to the one-finger upward flick (single-touch gesture) but also to a predetermined multi-touch gesture. For example, when detecting a pinch out by the touch screen 2B while the screen 45d is displayed on the display 2A, the smartphone 1 enlarges the text and the image displayed on the screen 45d. When detecting a pinch in by the touch screen 2B while the screen 45d is displayed on the display 2A, the smartphone 1 reduces the text and the image displayed on the screen 45d.

Figure 9:
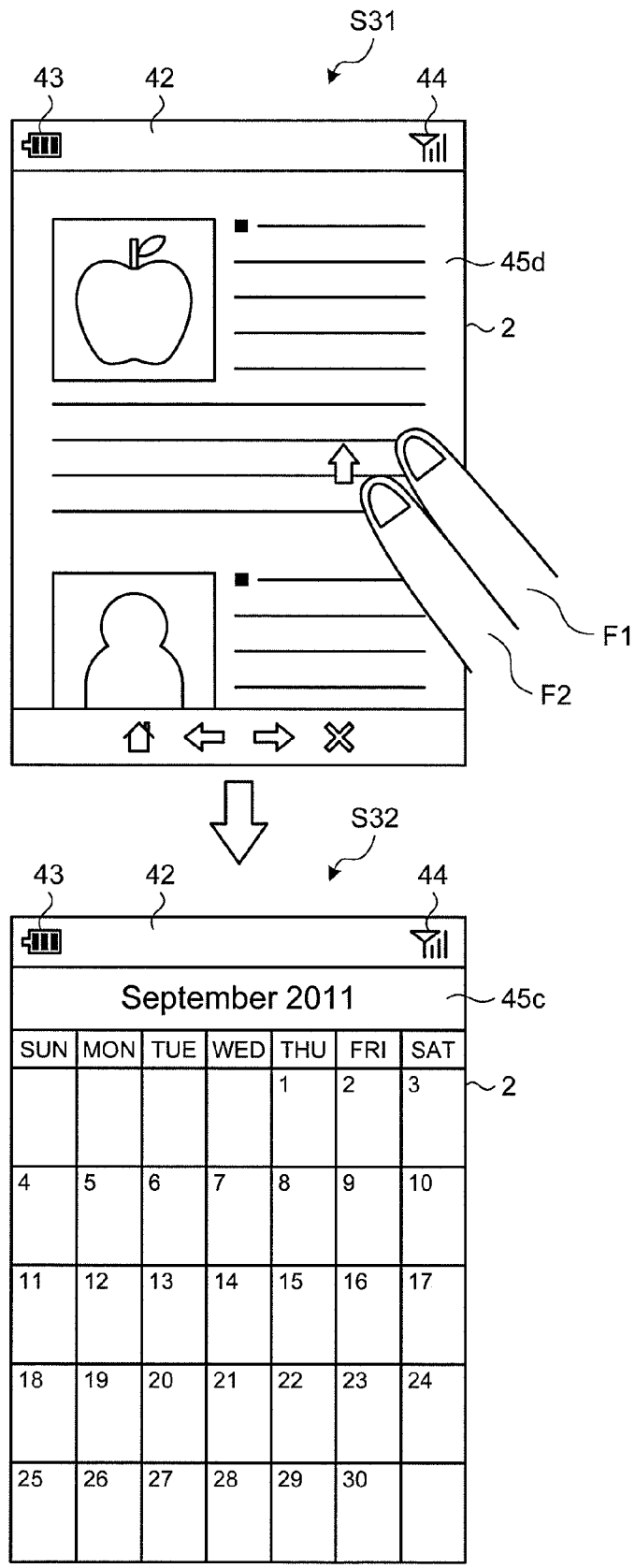
FIG. 9 is a diagram illustrating a third example of the control performed by the smartphone

FIG. 9 is a diagram illustrating a third example of the control performed by the smartphone according to the embodiment. At Step S31, the smartphone 1 is assumed to execute the navigate application 9D, the music player application 9E, and the calendar application 9F in the background, similarly to Step S18 in FIG. 7.

As illustrated at Step S31, the smartphone 1 displays the screen 45d same as that of Step S18 in FIG. 7 on the display 2A. At Step S31, the user performs an upward flick on the touch screen display 2 with his/her two fingers (finger F1 and finger F2).

When detecting the two-finger upward flick on the touch screen display 2, the smartphone 1 displays the screen 45c as illustrated at Step S32. In other words, at Step S32, the smartphone 1 executes the calendar application 9F having been executed in the background, in the foreground. At Step S32, the smartphone 1 then executes the browser application 9C having been executed in the foreground at Step S31, in the background.

The first example to the third example of the control performed by the smartphone according to the present embodiment have been explained so far with reference to FIG. 7 to FIG. 9.

When detecting the one-finger upward flick (single-touch gesture) by the touch screen 2B while the screen 45d of the browser application 9C being executed in the foreground is displayed on the display 2A, the smartphone 1 causes the browser application 9C to scroll the screen 45d according to the one-finger upward flick. Meanwhile, when detecting the two-finger upward flick (multi-touch gesture) by the touch screen 2B while, the screen 45d is displayed on the display 2A, the smartphone 1 executes the calendar application 9F being executed in the background, in the foreground.

In this manner, when the multi-touch gesture is performed on the touch screen display 2, the smartphone 1 switches between the application executed in the foreground and the application executed in the background. This prevents the user of the smartphone 1 from performing troublesome operations such that he/she causes a list of applications executed in the background to be displayed on the display 2A and selects an application displayed in the list in order to switch between applications. Therefore, the operability is improved.

Moreover, a multi-touch gesture being a trigger to switch between applications is different from a multi-touch gesture assigned to the operation of an application executed in the foreground. This enables the user to discriminate the gesture for the application executed in the foreground from the gesture for switching of the application. Therefore, a provability of erroneous operation may be low.

FIG. 9 represents the example in which when the two-finger upward flick is performed on the touch screen display 2, the smartphone 1 executes the calendar application 9F with the shortest elapsed time since the switch from the foreground to the background, in the foreground. However, when the two-finger upward flick is performed, the smartphone 1 may execute the navigate application 9D with the longest elapsed time since the switch from the foreground to the background, in the foreground.

Alternatively, when a two-finger downward flick is performed on the touch screen display 2, the smartphone 1 may execute an application with the shortest elapsed time since the switch from the foreground to the background, in the foreground. When the two-finger downward flick is performed on the touch screen display 2, the smartphone 1 may execute an application with the longest elapsed time since the switch from the foreground to the background, in the foreground. That is, the smartphone 1 can associate a direction of a multi-touch gesture with any length of elapsed time since the switch from the foreground to the background, and determine an application to be switched from the background to the foreground according to the direction of the multi-touch gesture.

Figure 10:
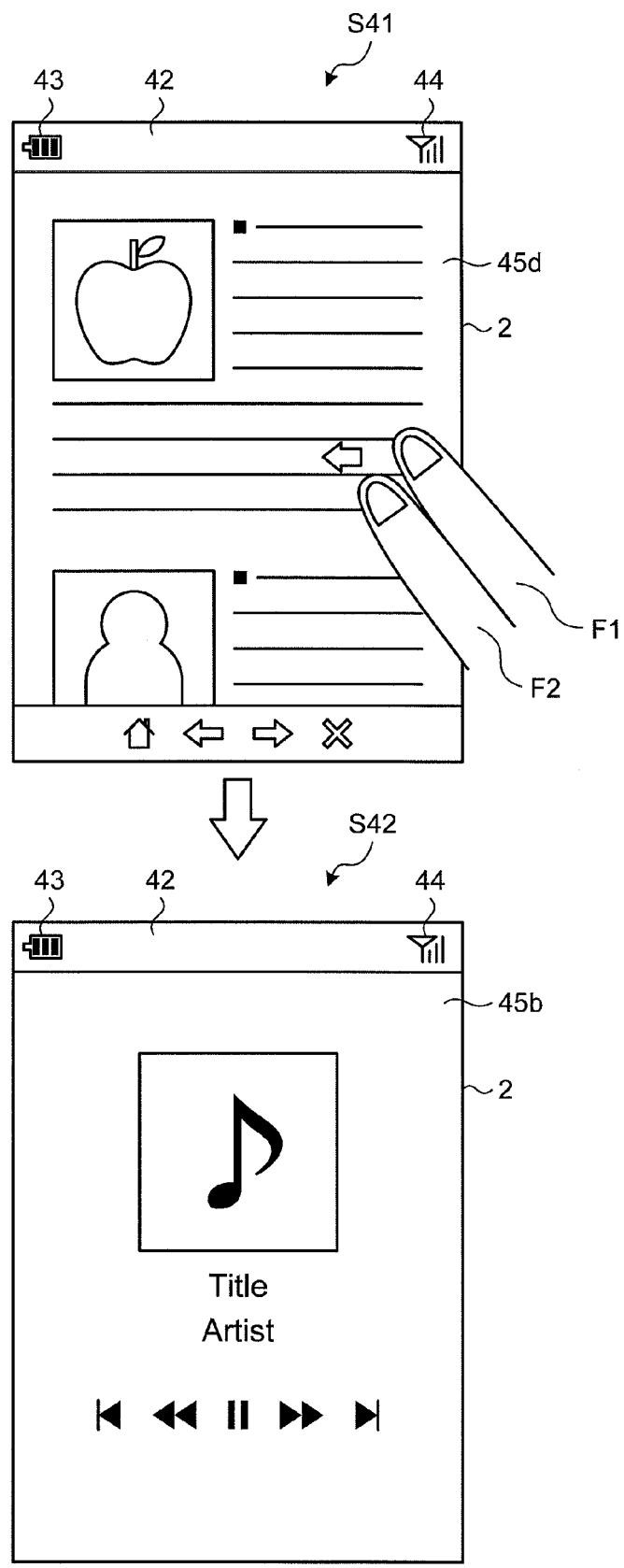
FIG. 10 is a diagram illustrating a fourth example of the control performed by the smartphone.

FIG. 10 is a diagram illustrating a fourth example of the control performed by the smartphone according to the embodiment. At Step S41, the smartphone 1 is assumed to execute the navigate application 9D, the music player application 9E, and the calendar application 9F in the background, similarly to Step S18 in FIG. 7. Moreover, the smartphone 1 is assumed to output music reproduced by the music player application 9E through the receiver 7 or the speaker 11.

As illustrated at Step S41, the smartphone 1 displays the screen 45d same as that of Step S18 in FIG. 7 on the display 2A. At Step S41, the user performs a leftward flick on the touch screen display 2 with the two fingers (finger F1 and finger F2).

When detecting the two-finger leftward flick on the touch screen display 2, the smartphone 1 displays the screen 45b of the music player application 9E that is outputting a sound on the display 2A, as illustrated at Step S42. In other words, at Step S42, the smartphone 1 executes the music player application 9E being executed in the background, in the foreground. At Step S42, the smartphone 1 executes the browser application 9C having been executed in the foreground at Step S41, in the background.

As illustrated in FIG. 10, when detecting the two-finger leftward flick by the touch screen 2B while the screen 45d of the browser application 9C being executed in the foreground is displayed on the display 2A, the smartphone 1 executes the music player application 9E being executed in the background and outputting a sound, in the foreground.

This enables the user of the smartphone 1 to execute the application outputting a sound in the foreground and to quickly execute an operation such as stop of music or fast-forward thereof. Therefore, the operability is further improved.

Figure 11:
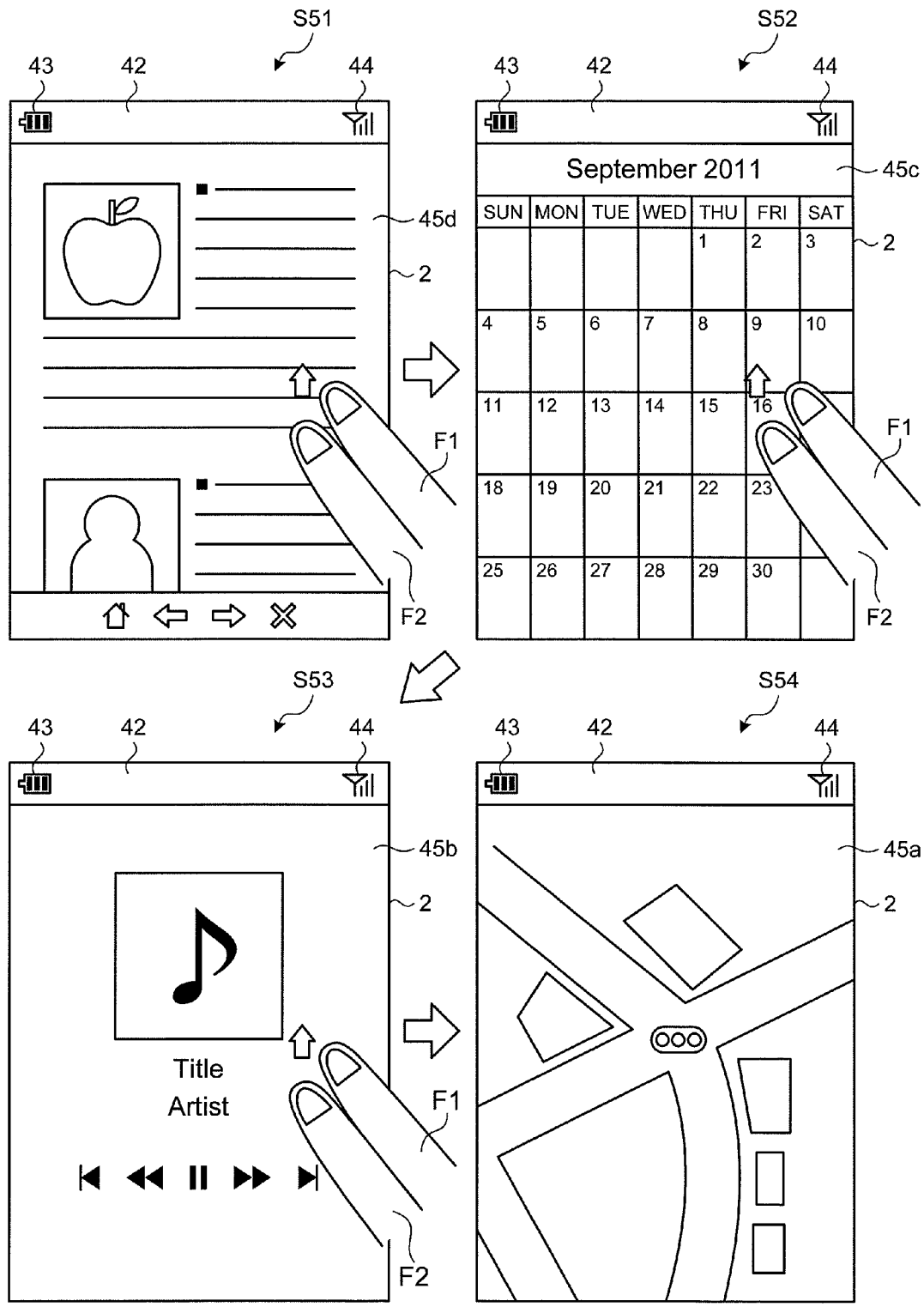
FIG. 11 is a diagram illustrating a fifth example of the control performed by the smartphone.

FIG. 11 is a diagram illustrating a fifth example of the control performed by the smartphone according to the embodiment. At Step S51, the smartphone 1 is assumed to execute the navigate application 9D, the music player application 9E, and the calendar application 9F in the background, similarly to Step S18 in FIG. 7.

As illustrated at Step S51, the smartphone 1 displays the screen 45d same as that of Step S18 in FIG. 7 on the display 2A. At Step S51, the user performs an upward flick on the touch screen display 2 with the two fingers (finger F1 and finger F2).

When detecting the two-finger upward flick on the touch screen display 2, the smartphone 1 displays the screen 45c on the display 2A, as illustrated at Step S52. In other words, at Step S52, the smartphone 1 executes the calendar application 9F being executed in the background, in the foreground.

Subsequently, at Step S52, the user performs an upward flick on the touch screen display 2 with the two fingers (finger. F1 and finger F2).

When detecting the two-finger upward flick on the touch screen display 2, the smartphone 1 displays the screen 45b on the display 2A, as illustrated at Step S53. In other words, at Step S53, the smartphone 1 executes the music player application 9E being executed in the background, in the foreground.

Subsequently, at Step S53, the user performs an upward flick on the touch screen display 2 with the two fingers (finger F1 and finger F2).

When detecting the two-finger upward flick on the touch screen display 2, the smartphone 1 displays the screen 45a on the display 2A, as illustrated at Step S54. In other words, at Step S54, the smartphone 1 executes the navigate application 9D being executed in the background, in the foreground.

As illustrated in FIG. 11, each time the two-finger upward flick is detected by the touch screen 2B, the smartphone 1 executes the applications being executed in the background in the foreground one by one in order from the application with the shortest elapsed time since the switch from the foreground to the background. With these steps, the user of the smartphone 1 can quickly execute any application other than the application most recently executed in the foreground. Therefore, the operability is further improved.

FIG. 11 represents the example in which each time the two-finger upward flick is performed on the touch screen display 2, the smartphone 1 executes the applications being executed in the background in the foreground in order from the application with the shortest elapsed time since the switch from the foreground to the background. However, each time the two-finger upward flick is performed on the touch screen display 2, the smartphone 1 may execute the applications being executed in the background in the foreground in order from the application with the longest elapsed time since the switch from the foreground to the background.

Alternatively, each time the two-finger downward flick is performed on the touch screen display 2, the smartphone 1 may execute the applications being executed in the background in the foreground in order from the application with the shortest elapsed time since the switch from the foreground to the background. That is, the smartphone 1 can associate a direction of a multi-touch gesture with any length of elapsed time since the switch from the foreground to the background, and determine an application to be switched from the background to the foreground according to the direction of the multi-touch gesture.

At Steps S52 to S54, when the application being executed in the background is to be executed in the foreground, the smartphone 1 may execute the application being currently executed in the foreground, in the background.

Figure 12:
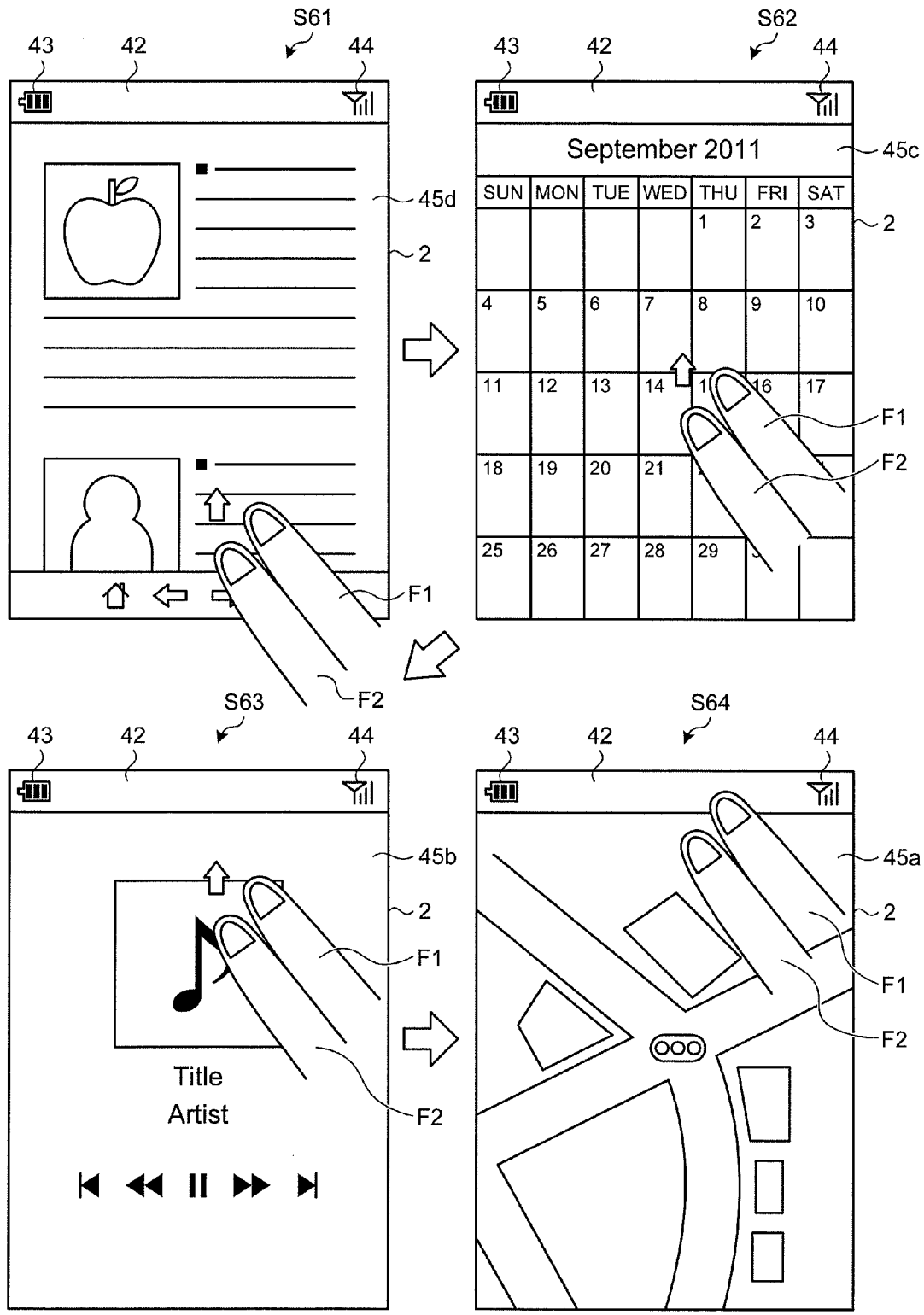
FIG. 12 is a diagram illustrating a sixth example of the control performed by the smartphone.

FIG. 12 is a diagram illustrating a sixth example of the control performed by the smartphone according to the embodiment. At Step S61, the smartphone 1 is assumed to execute the navigate application 9D, the music player application 9E, and the calendar application 9F in the background, similarly to Step S18 in FIG. 7. The application executed in the background is assumed to switch from the foreground to the background in order of the navigate application 9D, the music player application 9E, and the calendar application 9F, as illustrated from Steps S11 to S18 in FIG. 7.

As illustrated at Step S61, the smartphone 1 displays the screen 45d same as that of Step S18 in FIG. 7 on the display 2A. At Step S61, the user performs an upward swipe on the touch screen display 2 with the two fingers (finger F1 and finger F2).

When detecting the two-finger swipe on the touch screen display 2, the smartphone 1 detects an initial location thereon where the fingers comes in contact at first and a current location thereon where the fingers makes contact currently by the touch screen 2B, and calculates a distance between the initial location and the current location. The smartphone 1 compares the calculated distance with a threshold stored in the setting data 9Z of the storage 9. The setting data 9Z stores therein a first threshold, a second threshold, and a third threshold. The second threshold is greater than the first threshold, and the third threshold is greater than the second threshold.

When the distance between the initial location and the current location exceeds the first threshold, as illustrated at Step S62, the smartphone 1 executes the calendar application 9F being executed in the background, in the foreground.

When the distance between the initial location and the current location exceeds the second threshold, the smartphone 1 executes the music player application 9E being executed in the background, in the foreground, as illustrated at Step S63.

Furthermore, when the distance between the initial location and the current location exceeds the third threshold, the smartphone 1 executes the navigate application 9D being executed in the background, in the foreground, as illustrated at Step S64.

As illustrated in FIG. 12, when detecting the two-finger upward swipe by the touch screen 2B, the smartphone 1 executes one of the applications being executed in the background, in the foreground according to the distance of the swipe. The smartphone 1 executes an application with longer elapsed time since the switch from the foreground to the background, in the foreground, as the distance of the swipe is longer.

FIG. 12 represents the example in which when the two-finger upward swipe is performed on the touch screen display 2, the smartphone 1 executes the application with longer elapsed time since the switch from the foreground to the background, in the foreground, as the distance of the swipe is longer. However, when two-finger downward swipe is performed, the smartphone 1 may execute the processes illustrated in FIG. 12. When the two-finger upward swipe is performed thereon, the smartphone 1 may execute the application with shorter elapsed time since the switch from the foreground to the background, in the foreground, as the distance of the swipe is longer. When the two-finger downward swipe is performed thereon, the smartphone 1 may execute an application with shorter elapsed time since the switch from the foreground to the background, in the foreground, as the distance of the swipe is longer. That is, the smartphone 1 can associate a distance where a multi-touch gesture is performed with any length of elapsed time since the switch from the foreground to the background, and determine an application to be switched from the background to the foreground according to the distance where the multi-touch gesture is performed.

The smartphone 1 may change the threshold stored in the setting data 9Z according to the number of applications being executed in the background. For example, when n applications (n: natural number) are executed in the background, the smartphone 1 may set a length, which is obtained by multiplying a length along the longitudinal direction of the home screen 40 (a direction in which the swipe is detected) by k/n (k: natural number, $1 \leq k \leq n$), to a k-th threshold. When the distance of the two-finger swipe exceeds the k-th threshold, the smartphone 1 may execute a k-th application from an application with shortest elapsed time since the switch from the foreground to the background, in the foreground. With these steps, when the two-finger swipe is once performed, the smartphone 1 can execute all the applications being executed in the background in the foreground according to the distance of the swipe, thus improving the operability.

At Steps S62 to S64, when the application being executed in the background is to be executed in the foreground, the smartphone 1 may execute the application being currently executed in the foreground, in the background.

Figure 13:
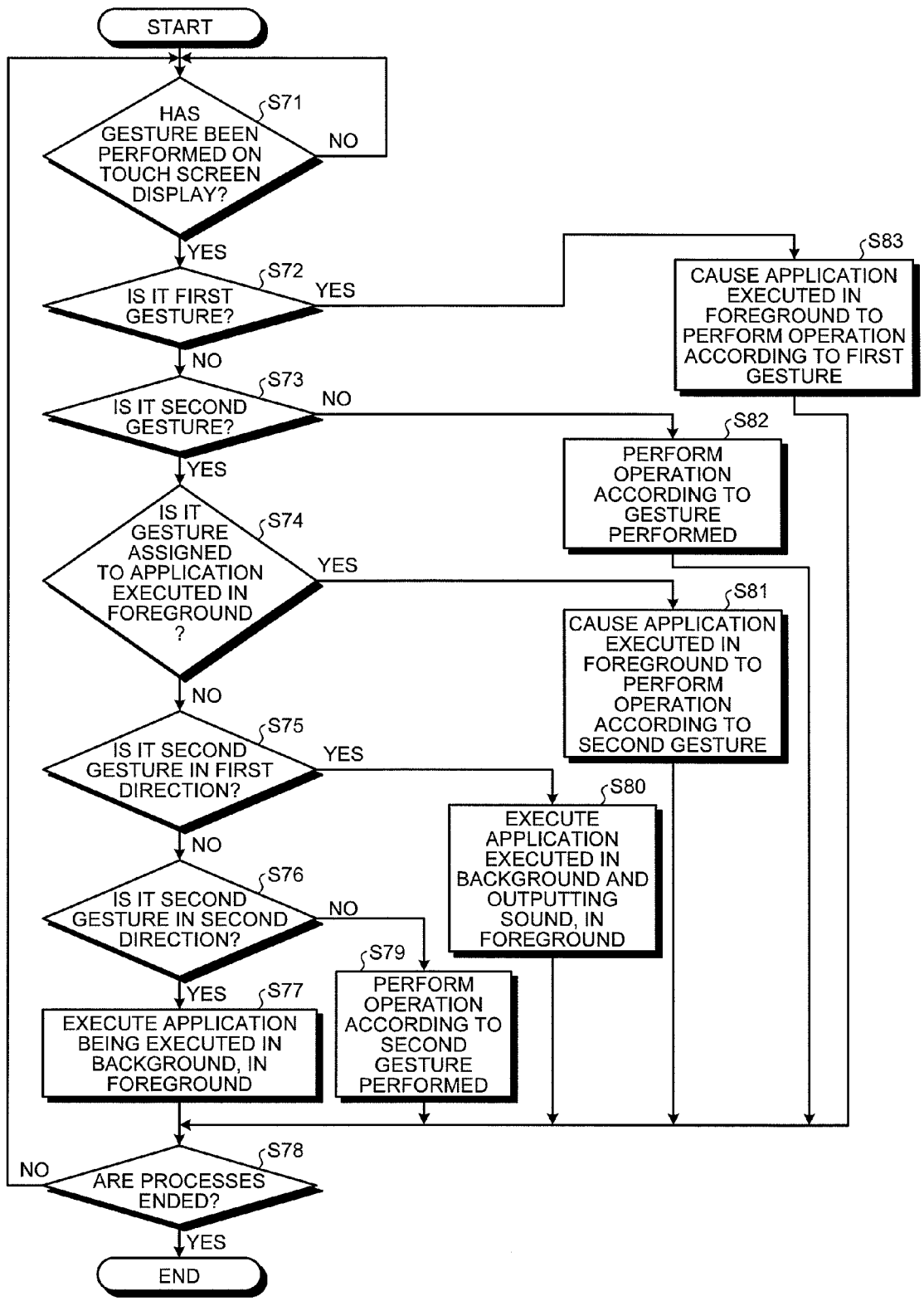
FIG. 13 is a flowchart of a processing procedure of the control performed by the smartphone.

Next, a processing procedure in which the smartphone 1 switches between the application executed in the foreground and the application executed in the background will be explained with reference to FIG. 13. FIG. 13 is a flowchart of the control performed by the controller 10 of the smartphone 1. The controller 10 can perform other processing procedure in parallel with the processing procedure illustrated in FIG. 13. The smartphone 1 is assumed to execute at least one application in the background and to display the screen of an application executed in the foreground on the display 2A at the time of starting the process in FIG. 13.

First, the controller 10 of the smartphone 1 determines whether any gesture has been performed on the touch screen display 2, at Step S71. When it is determined that any gesture has not been performed on the touch screen display 2 (No at Step S71), the controller 10 proceeds to Step S71. In this manner, the controller 10 repeats the process at Step S71 until any gesture performed on the touch screen display 2 is detected at Step S71.

When any gesture has been performed on the touch screen display 2 (Yes at Step S71), the controller 10 proceeds to Step S72. The controller 10 determines whether the gesture performed on the touch screen display 2 is a first gesture, at Step S72. The first gesture is, for example, a single-touch gesture.

When the gesture performed on the touch screen display 2 at Step S71 is the first gesture (Yes at Step S72), the controller 10 proceeds to Step S83. The controller 10 causes the application being executed in the foreground to perform an operation according to the first gesture, at Step S83. Then the controller 10 proceeds to Step S78.

The controller 10 determines whether a series of processes are ended, at Step S78. When the series of processes continue (No at Step S78), the controller 10 proceeds to Step S71. When the series of processes are ended (Yes at Step S78), the controller 10 ends the present process.

When the gesture performed on the touch screen display 2 at Step S71 is not the first gesture (No at Step S72), the controller 10 proceeds to Step S73. The controller 10 determines whether the gesture performed on the touch screen display 2 is a second gesture, at Step S73. The second gesture is, for example, a multi-touch gesture.

When the gesture performed on the touch screen display 2 is not the second gesture (No at Step S73), the controller 10 proceeds to Step S82. The controller 10 performs an operation according to the gesture performed on the touch screen display 2 at Step S71, at Step S82. The controller 10 does not have to perform any operation at Step S82. Then the controller 10 proceeds to Step S78. The processes of Step S78 and subsequent steps are the same as the processes above.

When the gesture performed on the touch screen display 2 is the second gesture (Yes at Step S73), the controller 10 proceeds to Step S74. The controller 10 determines whether the second gesture is a gesture assigned to any function in the application being executed in the foreground, at Step S74.

When the second gesture is a gesture assigned to any function in the application being executed in the foreground (Yes at Step S74), the controller 10 proceeds to Step S81. The controller 10 causes the application being executed in the foreground to perform an operation according to the second gesture, at Step S81. Then the controller 10 proceeds to Step S78. The processes of Step S78 and subsequent steps are the same as the processes above.

When the second gesture is not a gesture assigned to any function in the application being executed in the foreground (No at Step S74), the controller 10 proceeds to Step S75. The controller 10 determines whether the second gesture detected at Step S73 is a second gesture in a first direction, at Step S75. The first direction is, for example, a direction to the left on the screen of the application displayed on the display 2A, as illustrated in FIG. 10.

When the second gesture detected at Step S73 is the second gesture in the first direction (Yes at Step S75), the controller 10 proceeds to Step S80. The controller 10 executes the application being executed in the background and outputting a sound, in the foreground. Then the controller 10 proceeds to Step S78. The processes of Step S78 and subsequent steps are the same as the processes above.

When the second gesture detected at Step S73 is not the second gesture in the first direction (No at Step S75), the controller 10 proceeds to Step S76. The controller 10 determines whether the second gesture detected at Step S73 is a second gesture in a second direction, at Step S76. The second direction is, for example, a direction to the up on the screen of the application displayed on the display 2A, as illustrated in FIG. 9.

When the second gesture detected at Step S73 is not the second gesture in the second direction (No at Step S76), the controller 10 proceeds to Step S79. The controller 10 performs an operation according to the second gesture performed on the touch screen display 2, at Step S79. The controller 10 does not have to perform any operation at Step S79. Then the controller 10 proceeds to Step S78. The processes of Step S78 and subsequent steps are the same as the processes above.

When the second gesture detected at Step S73 is the second gesture in the second direction (Yes at Step S76), the controller 10 proceeds to Step S77. The controller 10 executes the application being executed in the background, in the foreground, at Step S77. The controller 10 executes the application being executed in the foreground, in the background, at Step S77. Then the controller 10 proceeds to Step S78.

The controller 10 determines whether a series of processes are ended, at Step S78. When the series of processes continue (No at Step S78), the controller 10 proceeds to Step S71. When the series of processes are ended (Yes at Step S78), the controller 10 ends the present process.

Next, modifications of the control performed by the smartphone 1 according to the embodiment so as to switch between an application executed in the foreground and an application executed in the background according to a user's operation to the device will be described below.

Figure 14:
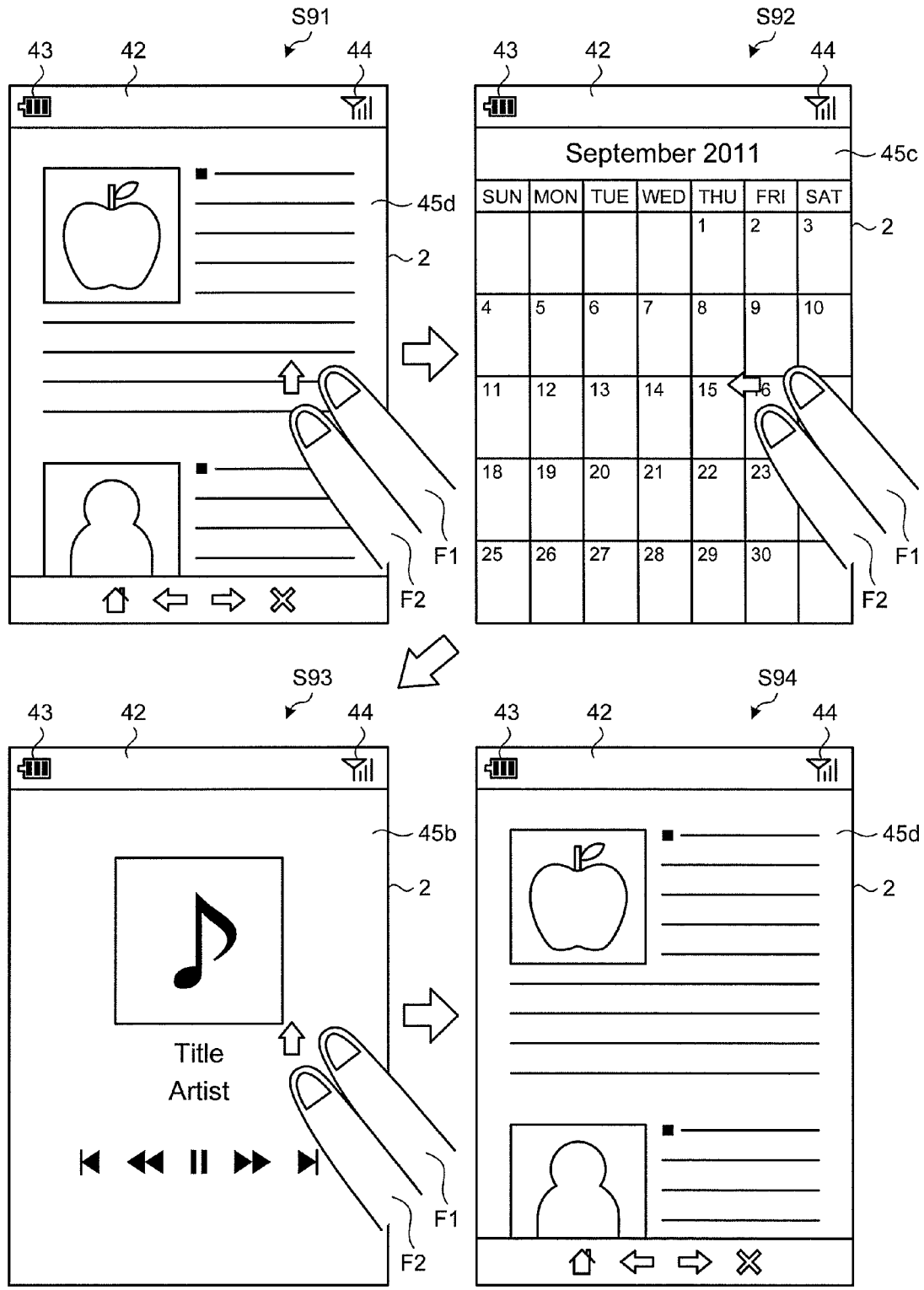
FIG. 14 is a diagram illustrating a first modification of the control performed by the smartphone.

FIG. 14 is a diagram illustrating a first modification of the control performed by the smartphone 1 according to the embodiment. The smartphone 1 displays the screen 45d on the display 2A as illustrated at Step S91. At Step S91, the user performs an upward flick on the touch screen display 2 with the two fingers (finger F1 and finger F2).

When detecting the two-finger upward flick on the touch screen display 2, the smartphone 1 executes the calendar application 9F having been executed in the background, in the foreground, as illustrated at Step S92. At Step S92, the smartphone 1 executes the browser application 9C having been executed in the foreground, in the background. At Step S92, the user performs a leftward flick on the touch screen display 2 with the two fingers (finger F1 and finger F2).

When detecting the two-finger leftward flick on the touch screen display 2, the smartphone 1 executes the music player application 9E having been executed in the background, in the foreground, as illustrated at Step S93. At Step S93, the user performs an upward flick on the touch screen display 2 with the two fingers (finger F1 and finger F2). If again detecting the two-finger leftward flick on the touch screen display 2 at Step S93, the smartphone 1 executes the navigate application 9D having been executed in the background, in the foreground.

When detecting the two-finger upward flick on the touch screen display 2, the smartphone 1 executes the browser application 9C having been executed in the background, in the foreground, as illustrated at Step S94.

As illustrated in FIG. 14, when detecting the two-finger upward flick by the touch screen 2B while the screen 45d of the browser application 9C being executed in the foreground is displayed on the display 2A, the smartphone 1 executes the calendar application 9F being executed in the background, in the foreground.

When detecting the two-finger leftward flick on the touch screen display 2 and then detecting the two-finger upward flick thereon, the smartphone 1 executes the browser application 9C having been executed in the foreground when the upward flick is first performed on the touch screen display 2, in the foreground.

In other words, the smartphone 1 stores the application having been executed in the foreground when the upward flick is performed on the touch screen display 2, and when the upward flick is again performed after the leftward flick is performed at least once, executes the stored application in the foreground. With these steps, after the shift of a specific application from the foreground to the background, the user can quickly execute the specific application in the foreground.

In the first modification, the leftward flick is performed once, however, the leftward flick may be performed a plurality of times. A flick used to store an application executed in the foreground does not limited to a flick in the upward direction. For example, the smartphone 1 may store an application being executed in the foreground when the downward flick is performed, and execute the stored application in the foreground when the next downward flick is performed. A flick used to switch between an application being executed in the background and an application being executed in the foreground does not limited to a flick in the leftward direction. For example, when the rightward flick is performed, the smartphone 1 may switch between an application being executed in the foreground and an application being executed in the background.

Figure 15:
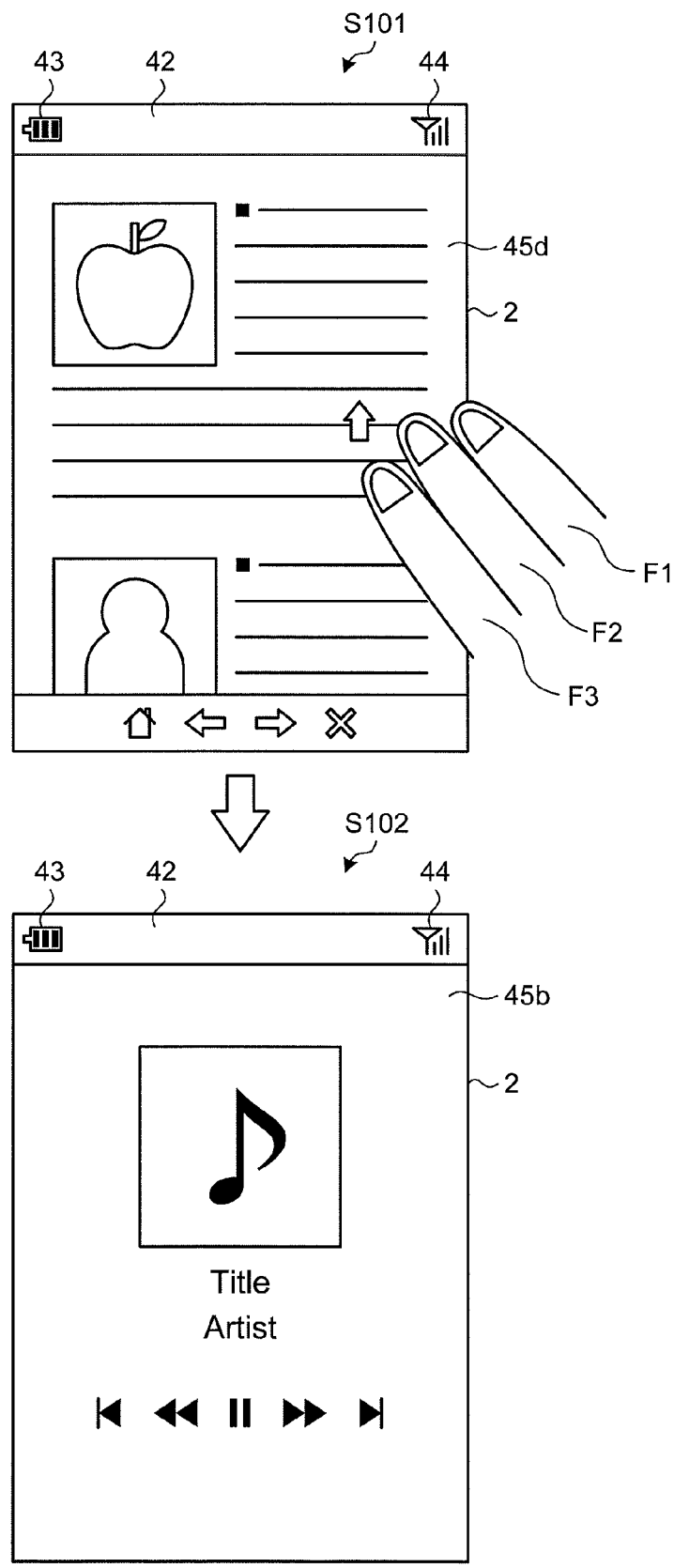
FIG. 15 is a diagram illustrating a second modification of the control performed by the smartphone.

FIG. 15 is a diagram illustrating a second modification of the control performed by the smartphone 1 according to the embodiment. At Step S101, the smartphone 1 is assumed to execute the navigate application 9D, the music player application 9E, and the calendar application 9F in the background, similarly to Step S18 of FIG. 7. Moreover, the smartphone 1 is assumed to output music reproduced by the music player application 9E through the receiver 7 or the speaker 11.

As illustrated at Step S101, the smartphone 1 displays the screen 45d on the display 2A. At Step S101, the user performs an upward flick on the touch screen display 2 with his/her three fingers (finger F1, finger F2, and finger F3).

When detecting the three-finger upward flick on the touch screen display 2, as illustrated in S102, the smartphone 1 displays the screen 45b on the display 2A. In other words, at Step S102, the smartphone 1 executes the music player application 9E being executed in the background and outputting a sound, in the foreground. At Step S102, the smartphone 1 executes the browser application 9C having been executed in the foreground at Step S101, in the background.

FIG. 10 represents the example in which the smartphone 1 executes the applications being executed in the background and outputting a sound in the foreground upon performing the two-finger leftward flick as a trigger. As illustrated in FIG. 15, the smartphone 1 may execute the application being executed in the background and outputting a sound in the foreground upon performing a three-finger gesture as a trigger. In other words, the smartphone 1 may change an application to be executed in the foreground according to the number of fingers for multi-touch gesture instead of the direction of the flick.

Alternatively, for example, when a swipe such as drawing a circle with the two fingers is performed, the smartphone 1 may execute the application being executed in the background and outputting a sound, in the foreground.

Figure 16:
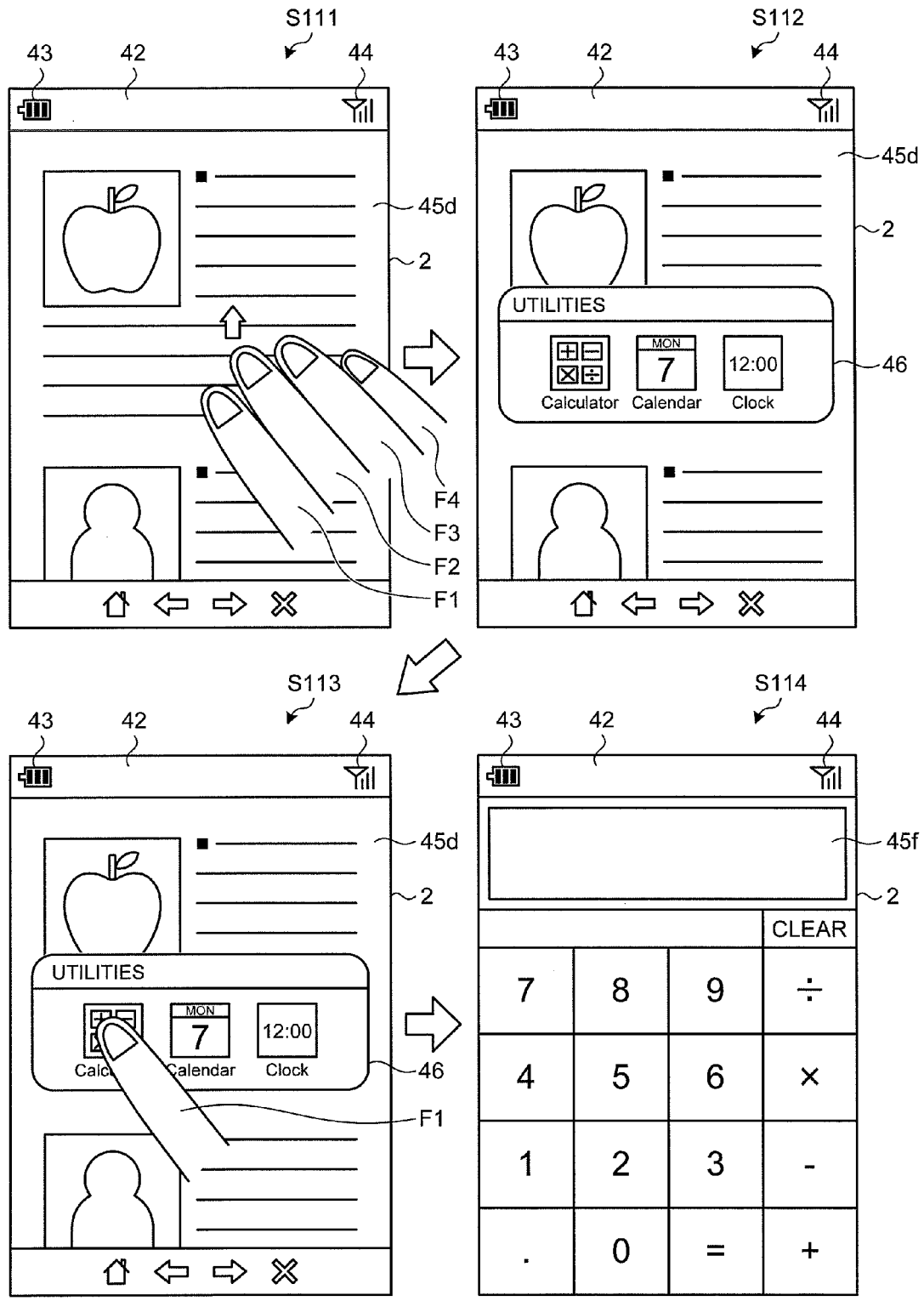
FIG. 16 is a diagram illustrating a third modification of the control performed by the smartphone.

FIG. 16 is a diagram illustrating a third modification of the control performed by the smartphone 1 according to the embodiment. As illustrated at Step S111, the smartphone 1 displays the screen 45d of the browser application 9C on the display 2A. At Step S111, the user performs an upward flick on the touch screen display 2 with his/her four fingers (finger F1, finger F2, finger F3, and finger F4).

When detecting the four-finger upward flick on the touch screen display 2, as illustrated in S112, the smartphone 1 displays a list 46 on the display 2A in such a manner as to be superimposed on the screen 45d.

The list 46 includes three icons: "Calculator" icon, "Calendar" icon, and "Clock" icon. These icons are those corresponding to applications that belong to a "Utilities" group stored in the table 9T, among applications being executed in the background by the smartphone 1.

At Step S113, the user's finger F1 taps the "Calculator" icon displayed in the list 46.

When detecting the tap on the "Calculator" icon, the smartphone 1 displays a screen 45f of the calculator application 9G on the display 2A, as illustrated at Step S114. In other words, at Step S114, the smartphone 1 executes the calculator application 9G having been executed in the background, in the foreground. At Step S114, the smartphone 1 executes the browser application 9C having been executed in the foreground at Step S111, in the background.

As illustrated in FIG. 16, the smartphone 1 may display a list of applications which are executed in the background and belong to a predetermined group upon performing a four-finger gesture as a trigger. Moreover, when an application is selected from the list, the smartphone 1 may execute the selected application in the foreground.

The embodiment disclosed in the present application can be modified without departing the gist and the scope of the invention. Moreover, the embodiments and its modifications disclosed in the present application can be combined with each other if necessary. For example, the embodiment may be modified as follows.

For example, the programs illustrated in FIG. 5 may be divided into a plurality of modules, or may be combined with any other program.

In the embodiment, the smartphone has been explained as an example of the device provided with the touch screen, however, the device according to the appended claims is not limited to the smartphone. The device according to the appended claims may be a mobile electronic device other than the smartphone. Examples of the mobile electronic devices include, but are not limited to, mobile phones, tablets, mobile personal computers, digital cameras, media players, electronic book readers, navigators, and gaming devices. The device according to the appended claims may be a stationary-type electronic device. Examples of the stationary-type electronic devices include, but are not limited to, desktop personal computers, automatic teller machines (ATM), and television receivers.

In the embodiment, when the button 3B is clicked while an application is executed in the foreground, the smartphone 1 executes the application in the background, however, this process is not limited thereto. For example, when the button 3A is clicked while an application is executed in the foreground, the smartphone 1 may execute the application in the background. Alternatively, the smartphone 1 may execute an application being executed in the foreground, in the background, according to a detection result of the acceleration sensor 15.

In the embodiment, when a multi-touch gesture is performed on the touch screen display 2, the smartphone 1 executes the application being executed in the foreground at that time, in the background, however, the process is not limited thereto. When a multi-touch gesture is performed on the touch screen display 2, the smartphone 1 may terminate the application being executed in the foreground at that time.

In the embodiment, the first direction is a direction toward the left of the screen, and the second direction is a direction toward the up of the screen, however, the directions are not limited thereto. For example, the first direction may be a direction toward the right of the screen or a direction toward the upper right of the screen. For example, the second direction may be a direction toward the down of the screen or a direction toward the lower left of the screen. The first direction and the second direction are only required to be at least directions different from each other.

In the embodiment, the smartphone 1 detects a single-touch gesture as the first gesture, and detects a multi-touch gesture as the second gesture, however, the gestures are not limited thereto. For example, the smartphone 1 may detect a touch gesture as the first gesture, and may detect a long-touch gesture as the second gesture. In other words, the smartphone 1 may detect a gesture of which operation time on the touch screen 2B is shorter than a given time, as the first gesture, and may detect a gesture of which operation time on the touch screen 2B is longer than the given time, as the second gesture, irrespective of the number of fingers detected by the touch screen 2B.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device, comprising:
a touch screen display for displaying a screen of applications; and
a controller, wherein
when a first gesture is performed on the touch screen display in a state where (i) one of the applications is executed in a foreground and (ii) the other applications are executed in a background and are invisible on the touch screen display, the controller is configured to cause the one of the applications to perform an operation according to the first gesture,
when a second gesture is performed on the touch screen display in the state, the controller is configured to switch the one of the applications in the foreground to the background and one of the other applications in the background to the foreground, and
every time the second gesture is performed in the state, the controller is configured to switch the one of the other applications in the background to the foreground one by one in an order reverse to an order in which each of the other applications was executed in the foreground.

2. The device according to claim 1, wherein the first gesture is a single-touch gesture, and the second gesture is a multi-touch gesture.

3. The device according to claim 1, wherein the controller is configured to execute, when the other applications are executed in the background, one of the other applications in the foreground each time the second gesture is performed.

4. The device according to claim 3, wherein the controller is configured to execute one of the other applications in the foreground in an order according to a direction in which the second gesture is performed.

5. The device according to claim 3, further comprising a sound output unit for outputting a sound reproduced by a third application, wherein the controller is configured to execute, when the second gesture in a first direction is performed while the third application reproducing the sound is executed in the background, the third application in the foreground, and to execute, when the second gesture in a second direction is performed while the third application reproducing the sound is executed in the background, one of the other applications in the foreground.

6. The device according to claim 3, wherein the controller is configured to execute the one of the applications in the foreground when the second gesture in a first direction is performed while the screen of the one of the applications is displayed on the touch screen display, subsequently the second gesture in a second direction is performed at least once, and further subsequently the second gesture in the first direction is performed.

7. The device according to a claim 1, wherein the controller is configured to execute, when the second gesture is performed while the other applications are executed in the background, one of the other applications in the foreground according to a distance where the second gesture is performed.

8. The device according to claim 7, wherein the controller is configured to execute control so that one of the other applications with longer elapsed time since the execution thereof in the foreground is executed in the foreground as the distance where the second gesture is performed is longer.

9. A method for controlling a device provided with a touch screen display for displaying a screen of applications, the method comprising:
executing one of the applications in a foreground;
executing the other applications in a background;
when a first gesture is performed on the touch screen display in a state where (i) the one of the applications is executed in the foreground and (ii) the other applications are executed in the background and are invisible on the touch screen display, causing the one of the applications to perform an operation according to the first gesture;
when a second gesture is performed on the touch screen display in the state, switching the one of the applications in the foreground to the background and one of the other applications in the background to the foreground; and
every time the second gesture is performed in the state, switching the one of the other applications in the background to the foreground one by one in an order reverse to an order in which each of the other applications was executed in the foreground.

10. A non-transitory storage medium that stores a program to be executed in a device provided with a touch screen display having a foreground and a background for displaying a screen of applications, the program is configured to:
- execute one of the applications in a foreground;
- execute the other applications in a background;
- when a first gesture is performed on the touch screen display in a state where (i) the one of the applications is executed in the foreground and (ii) the other applications are executed in the background and are invisible on the touch screen display, cause the one of the applications to perform an operation according to the first gesture;
- when a second gesture is performed on the touch screen display in the state, switch the one of the applications in the foreground to the background and one of the other applications in the background to the foreground; and
- every time the second gesture is performed in the state, switch the one of the other applications in the background to the foreground one by one in an order reverse to an order in which each of the other applications was executed in the foreground.

11. A device, comprising:
- a touch screen display for displaying a screen of applications; and
- a controller, wherein
  - when a first gesture is performed on the touch screen display in a state where (i) one of the applications is executed in a foreground and (ii) the other applications are executed in a background, the controller is configured to cause the one of the applications to perform an operation according to the first gesture,
  - when a second gesture is performed on the touch screen display in the state, the controller is configured to switch the one of the applications in the foreground to the background and one of the other applications in the background to the foreground, and
  - every time the second gesture is performed in the state, the controller is configured to switch the one of the other applications in the background to the foreground one by one in an order reverse to an order in which each of the other applications was executed in the foreground,
- wherein the order in which the applications were switched from the foreground to the background is a temporal order.

12. A method for controlling a device provided with a touch screen display for displaying a screen of applications, the method comprising:
- executing one of the applications in a foreground;
- executing the other applications in a background;
- when a first gesture is performed on the touch screen display in a state where (i) the one of the applications is executed in the foreground and (ii) the other applications are executed in the background, causing the one of the applications to perform an operation according to the first gesture;
- when a second gesture is performed on the touch screen display in the state, switching the one of the applications in the foreground to the background and one of the other applications in the background to the foreground; and
- every time the second gesture is performed in the state, switching the one of the other applications in the background to the foreground one by one in an order reverse to an order in which each of the other applications was executed in the foreground,
- wherein the order in which the applications were switched from the foreground to the background is a temporal order.

13. A non-transitory storage medium that stores a program to be executed in a device provided with a touch screen display having a foreground and a background for displaying a screen of applications, the program is configured to:
- execute one of the applications in a foreground;
- execute the other applications in a background;
- when a first gesture is performed on the touch screen display in a state where (i) the one of the applications is executed in the foreground and (ii) the other applications are executed in the background, cause the one of the applications to perform an operation according to the first gesture;
- when a second gesture is performed on the touch screen display in the state, switch the one of the applications in the foreground to the background and one of the other applications in the background to the foreground; and
- every time the second gesture is performed in the state, switch the one of the other applications in the background to the foreground one by one in an order reverse to an order in which each of the other applications was executed in the foreground,
- wherein the order in which the applications were switched from the foreground to the background is a temporal order.

* * * * *